Jan. 22, 1957  A. J. HORLING, JR  2,778,690
SPOKE NIPPLE FOR BICYCLE WHEEL
Filed May 15, 1953
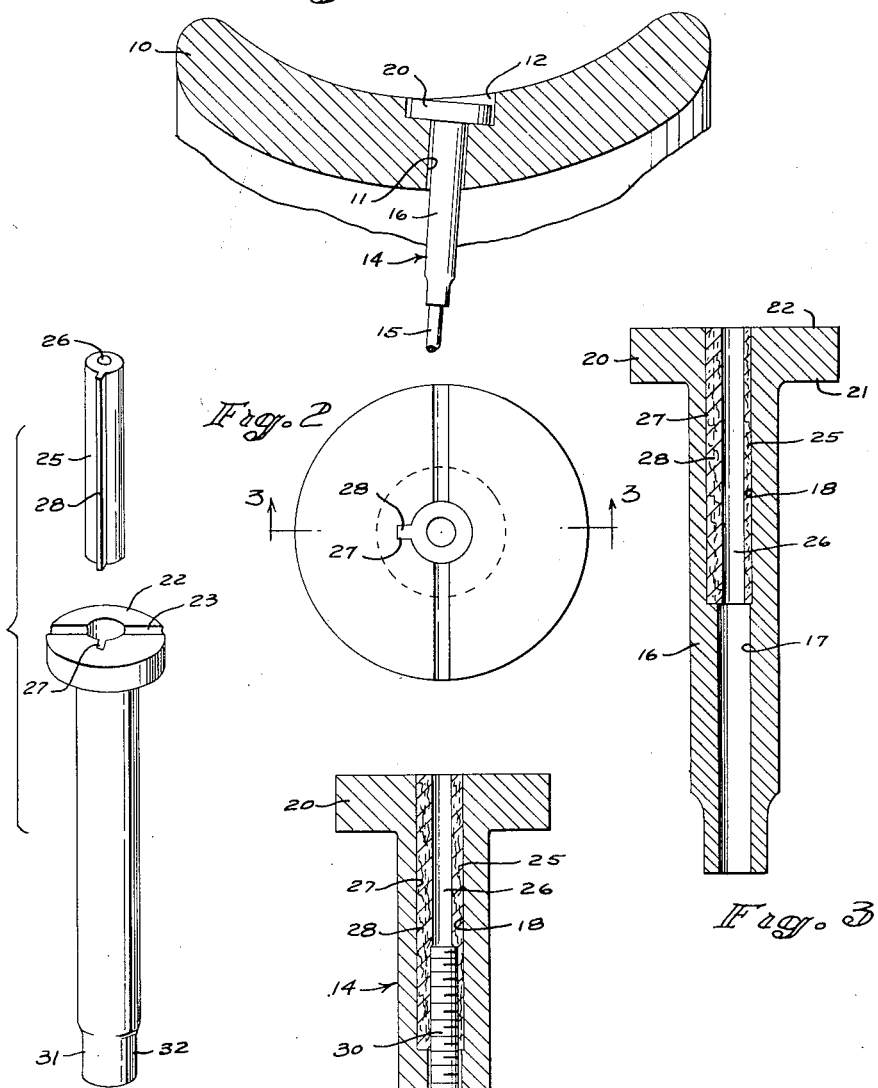
INVENTOR.
Anthony J. Horling Jr.
BY
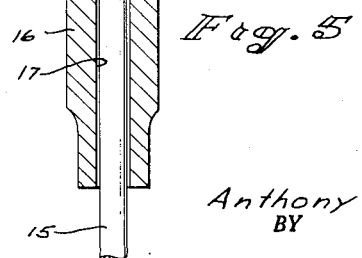
ATTORNEYS

United States Patent Office 2,778,690
Patented Jan. 22, 1957

2,778,690

SPOKE NIPPLE FOR BICYCLE WHEEL

Anthony J. Horling, Jr., Cranford, N. J.

Application May 15, 1953, Serial No. 355,327

1 Claim. (Cl. 301—58)

This invention relates to spoke nipples for bicycle wheels and other wire spoke wheels and more particularly to a nipple formed of hard material having therein an inset of softer material for receiving the screw threaded end of an associated wire spoke.

The wire spokes of bicycle wheels are usually made of a relatively soft material, such as mild steel, and have very fine screw threads on the screw threaded end thereof. The nipples which extend through apertures in the wheel rim and receive the screw threaded ends of the spokes are normally formed of a metal, such as brass or bronze, somewhat softer than the metal of the spokes so that the screw threads in the nipples will not strip the screw threads on the spokes when the nipples are turned to tighten the spokes, the material of the nipples being also resistant to corrosion so that the screw threaded ends of the spokes will not become frozen or stuck in the nipples.

Forming the nipples of brass or bronge is, however, expensive since the material itself is expensive and, at times difficult to obtain, and the manufacturing of these nipples is also expensive since several manufacturing steps are required including one of internally screw threading the nipples.

It is therefore among the objects of the invention to provide a spoke nipple which is inexpensive to produce since it can be formed of an inexpensive and readily available material, such as iron or steel, by an inexpensive manufacturing process such as by an automatic screw machine or by casting, since it requires no internal screw threading; which includes an insert of corrosion resisting, inexpensive material, such as compressed fiber, softer than the material of the corresponding spokes, into which the screw threaded end of the corresponding spoke is self-threaded; and which are fully effective to hold the associated spokes under proper tension.

Other objects and advantages will appear apparent from a consideration of the following description and the appended claim in conjunction with the accompanying drawings, wherein:

Figure 1 is a transverse cross sectional view of a wheel rim showing a spoke nipple operatively mounted in the rim and a spoke fragment engaged with the nipple;

Figure 2 is an end elevational view on an enlarged scale of the spoke nipple illustrated in Figure 1;

Figure 3 is a longitudinal cross sectional view on the line 3—3 of Figure 2;

Figure 4 is an exploded perspective view of the spoke nipple and an insert therefor; and Figure 5 is a longitudinal cross sectional view similar to Figure 3 but showing the manner in which a spoke is engaged in the nipple.

With continued reference to the drawing, the wheel rim 10, such as the rim of a bicycle wheel, has apertures, as indicated at 11, extending therethrough, these apertures usually being alternately disposed at opposite sides of the annular center line of the rim and slightly inclined relative to a plane including the annular center line of the wheel rim so that the spoke nipples extending through these apertures will be inclined in the direction of the spokes extending to the rim from the opposite end of the associated wheel hub, not illustrated. A recess or counterbore, as indicated at 12, is provided in the outer side of the wheel rim 10 at the inner end of each aperture 11 and disposed substantially coaxially of the corresponding aperture 11 and a spoke nipple, as generally indicated at 14, extends through each aperture 11 in the wheel rim and threadedly receives the outer end of a corresponding wire spoke 15.

In accordance with the present invention, the nipple 14 includes an elongated tubular body 16 of substantially cylindrical shape having a bore 17 extending longitudinally and coaxially therethrough and a counterbore 18 of a diameter somewhat greater than the diameter of the bore 17 extending coaxially of the bore 17 from a location intermediate the length of the tubular body 16 to one end of the tubular body. A flat head 20 is provided on the end of the body 16 to which the counterbore 18 opens and this head has inner and outer surfaces 21 and 22 both disposed substantially perpendicular to the longitudinal center line of the body 16. If desired the head may have in its outer surface 22 a diametrically extending tool slot 23 for receiving a tool, such as a screw driver by means of which the nipple can be conveniently turned to tighten the associated spoke when the wheel is being assembled.

When the nipple is mounted in the wheel rim the tubular stem portion 16 thereof extends through the aperture 14 inwardly of the rim and the head 20 is seated in the recess 12 provided in the outer or tire-receiving surface of the rim at the outer end of the corresponding aperture 11, the head bearing on the portion of the rim surrounding the aperture 11 to support the nipple in the rim.

A tubular insert 25 is disposed in and extends longitudinally of the counterbore 18 in the stem 16, this insert being formed of a material, such as compressed fiber, softer than the material of the stem 16 and head 20 which material may be iron or steel. The insert 25 has a bore 26 extending longitudinally and coaxially therethrough and disposed coaxially of the bore 17 of the stem 16, the bore 26 in the insert having a diameter somewhat less than the bore 17, as illustrated in Figure 3. The insert 25 is held against rotation in the nipple by longitudinally grooving or roughening the surface of the counterbore 18 and either providing the insert 25 on its external surface with complementary grooves or ridges or by forcing the insert into the counterbore with sufficient pressure to roughen the outer surface of the insert in a manner complementary to the roughened surface of the counterbore. In the arrangement illustrated the interlocking means between the insert and the nipple is illustrated by a groove 27 extending longitudinally of the counterbore 18 and a key 28 extending longitudinally of the insert 25 and received in the groove 27.

The bore 26 in the insert 25 has a diameter somewhat less than the diameter of the screw threaded end 30 of the associated spoke 15, so that the screw threaded end of the spoke can be self-threaded into the bore of the insert and it is not necessary to internally screw thread the insert, the self-threading of the spoke into the insert being illustrated in Figure 5.

In addition to the tool slot 23 in the head thereof the nipple is provided at the end of the stem remote from the head with flattened areas 31 and 32 with which a suitable wrench can be engaged to turn the nipple without removing the associated tire from the wheel rim to provide access to the head of the nipple.

As explained above, with this construction the nipple, including the stem 16 and the head 20 can be formed of an inexpensive, hard material, such as iron or steel which can be cast or automatically machined to proper shape and the insert can be formed of an inexpensive and readily available material, such as compressed fiber and forced into the counterbore of the nipple. By forming the nipple and its insert of such inexpensive material and with a minimum of machine operations with the omission of internal screw threads from the insert, the nipple can be inexpensively provided and yet will have the full effect and efficiency of the expensive nipples formed of such expensive materials as brass or bronze and completely machined.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

In combination, a wheel spoke nipple having first and second ends, a nipple bore extending axially in said nipple from said first end to a point intermediate the ends of the nipple, a counterbore in said nipple extending from said second end of the nipple to said nipple bore and being coaxial with said nipple bore, said counterbore being larger in diameter than said nipple bore and said nipple bore being not substantially larger in diameter than a wheel spoke to be accommodated therein, a key groove extending along and opening into said counterbore, an insert in said counterbore of softer material than said nipple and a wheel spoke, said insert having a key portion engaged in said key groove, said insert further having an insert bore coaxial with the nipple bore, said insert bore being initially unthreaded, and a wheel spoke extending in said nipple bore through said first end of the nipple, said spoke having a threaded portion self-threaded in the insert bore.

References Cited in the file of this patent
UNITED STATES PATENTS

| | | |
|---|---|---|
| 661,376 | Marshall | Nov. 6, 1900 |
| 1,059,209 | Rawlings | Apr. 15, 1913 |
| 1,922,120 | Brosig | Aug. 15, 1933 |

FOREIGN PATENTS

| | | |
|---|---|---|
| 825,657 | Germany | Dec. 20, 1951 |